United States Patent
Kunkel

(10) Patent No.: US 6,404,111 B1
(45) Date of Patent: Jun. 11, 2002

(54) DEVICE FOR DEGERMINATING WATER PASSING THROUGH A SANITARY DEVICE

(75) Inventor: Horst Kunkel, Stuttgart (DE)

(73) Assignee: Hansa Metallwerke AG (DE)

( * ) Notice: Subject to any disclaimer, the term of this patent is extended or adjusted under 35 U.S.C. 154(b) by 0 days.

(21) Appl. No.: 09/486,200

(22) PCT Filed: Jul. 14, 1998

(86) PCT No.: PCT/EP98/04373

§ 371 (c)(1),
(2), (4) Date: May 16, 2000

(87) PCT Pub. No.: WO99/10282

PCT Pub. Date: Mar. 4, 1999

(30) Foreign Application Priority Data

Aug. 22, 1997 (DE) .......................... 197 36 631

(51) Int. Cl.[7] .................................. H01J 7/24
(52) U.S. Cl. ...................... 313/24; 250/436; 250/504 R
(58) Field of Search ............................ 313/24; 250/436, 250/504 R

*Primary Examiner*—Vip Patel

(57) ABSTRACT

The invention relates to a device (1) for degerminating water passing through a sanitary appliance, comprising a housing (2) through which water can flow, and a UV lamp (12) located therein. Said UV-lamp (12) is connected to an external current source by a terminal base (10) made up of two detachable parts (10a, 10b). The first part (10a) of the receiving base (10) is fixed on the housing (2, 3, 4) and contains a first coil (23) which can be connected to the external current source. The other part (10b) of the terminal base (10) has a receiving opening (15) into which the base area (13) of the UV-lamp can be tightly inserted. A second coil (26) is also integrated into this second part (10b). When the terminal base (10) is assembled, the second coil (26) is so close to the first coil (23) in the first part (10a) that the two coils (23, 26) perform the function of a transformer transmitting power without a galvanic connection forming between the two parts (10a, 10b) of the terminal base.

8 Claims, 3 Drawing Sheets

DEVICE FOR DEGERMINATING WATER PASSING THROUGH A SANITARY DEVICE

Figure 1:
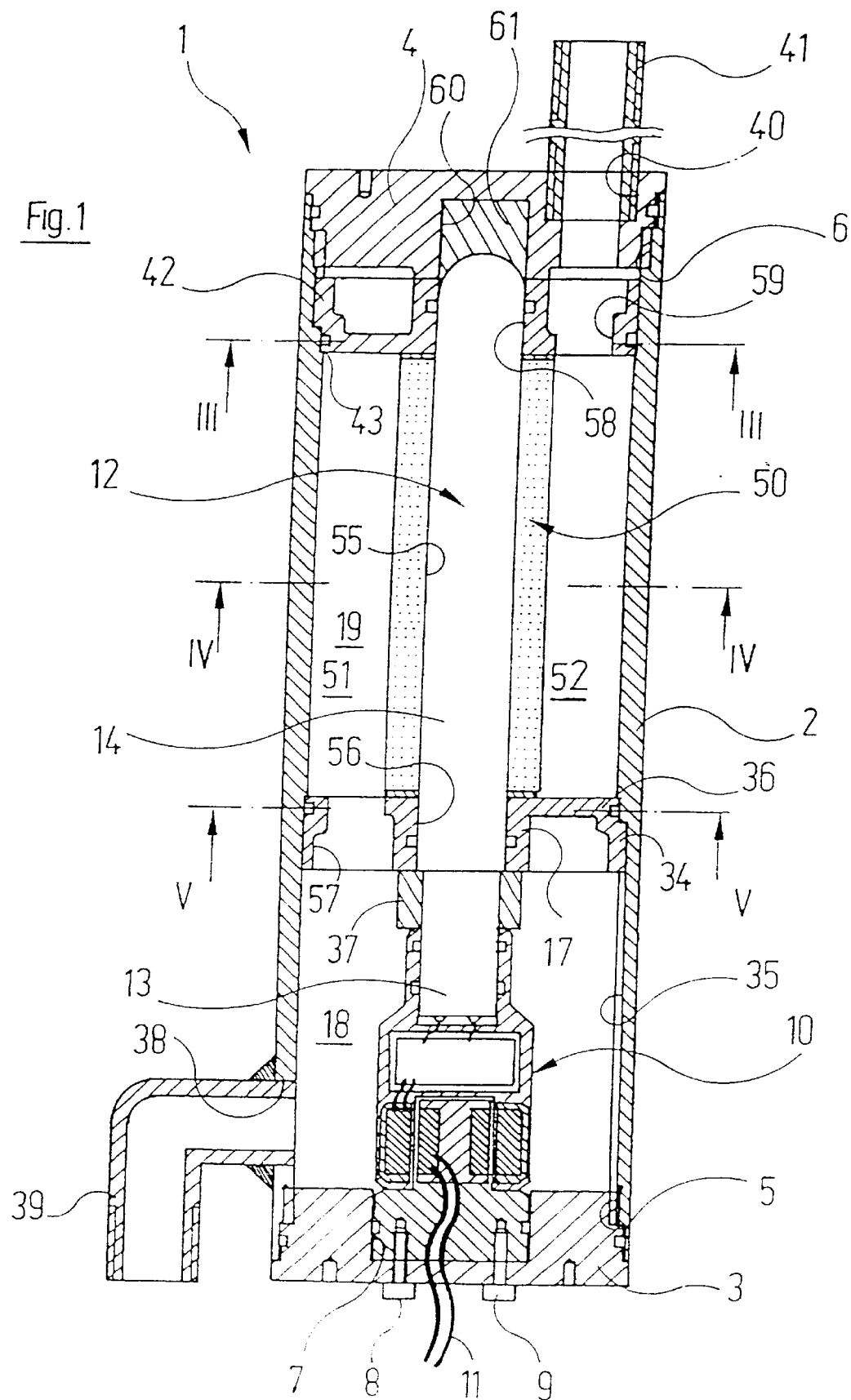

The invention relates to a device for sterilizing water flowing through a sanitary appliance, having
- a) a housing, which comprises an inlet and an outlet for the water;
- b) a UV lamp, which is disposed inside the housing and the radiation of which is directed towards the water flowing through;
- c) a connection backplate, which is connectable to an external power source and has a location opening, into which a cap region of the UV lamp is insertable, wherein location opening and cap region have contacts which lie against one another in the operating position of the UV lamp.

In recent years the dangers arising in the field of sanitation from water contaminated with micro-organisms, in particular bacteria, amoebae or other monocellular organisms, have become ever clearer. Increased importance is therefore being attached to water sterilization. In said connection, there have been reports of experiments to sterilize flowing water through exposure to UV light, which is of a wavelength suitable for killing micro-organisms carried along in the water. To extend the retention time of said micro-organisms in the region of the UV lamp, an additional filtering apparatus may be used. The devices of the type described initially, which are known from said experiments, therefore comprised for connection of the UV lamp a connection backplate, the contacts of which had a direct or indirectly conductive connection to the external power source. Thus, when the housing of the device had to be opened to exchange the UV lamp, there was a risk of the contacts being live if the external power source had not been disconnected or isolated. For said reason and because of the deep-seated reluctance of plumbers to have anything to do with electrical appliances, the experimental built-on accessories of the initially described devices were unsuitable for practical use.

The object of the present invention is to refine a device of the type described initially in such a way that reliably rules out contact with live parts during operation and during repair or maintenance of the device and therefore dispels the misgivings about handling said devices felt by persons unused to dealing with electricity.

Said object is achieved according to the invention in that
- d) the connection backplate is subdivided into two detachable, intermateable parts, of which the one is fastened to the housing and the other has the location opening;
- e) the two parts of the connection backplate each contain a coil, which coils are adjacent to one another in the intermated state of the backplate, wherein the coil in the part fastened to the housing is connectable to the external power source and the coil in the other part is connected directly or indirectly to the contacts of the location opening of said part, wherein
- f) the location opening of the connection backplate is sealed against the cap region of the UV lamp.

According to the invention, there is therefore no conductive connection—not even an indirect one—between the contacts in the location opening of the connection backplate and the external power source. Rather, the power transmission from one part of the connection backplate to the other is effected exclusively inductively in the manner of a transformer, wherein the primary and the secondary winding of said "transformer" are situated on different parts of the connection backplate. Given said construction according to the invention, when the part of the connection backplate fastened to the housing is removed, there are no exposed contacts on it whatsoever. Even when the external power source is not isolated from said first part of the connection backplate, this poses no risks whatsoever. Separation of the two parts of the connection backplate immediately de-energizes the second part of the connection backplate, including the contacts disposed in its location opening. Whoever carries out maintenance work inside the device, e.g. exchanges the UV lamp, need not fear coming into contact with live parts. This gives the user a feeling of great confidence, which particularly in the case of water-carrying appliances is psychologically of an importance which should not be underestimated.

The connection of the two parts of the connection backplate may be effected, for example, in that the one of said two parts comprises a cylindrical neck which, in the intermated state of the connection backplate, projects into a complementary recess of the other part. In said manner, the two parts are provided with the "typical" configuration of a male and female connector part. The rotationally symmetric connection of the two parts of the connection backplate also enables a twisting of the housing part, e.g. a base, to which the one part of the connection backplate is fastened. Such twisting may be expedient when the housing part in question is, for example, detachably fastened by means of a screwed connection to the remaining housing.

The two coils in the two parts of the connection backplate, in the intermated state of the latter, are advantageously disposed coaxially with one another, one inside the other. Optimum efficiency of the inductive power transmission is thereby achieved.

It is further recommended that the two coils are enclosed, in particular encapsulated, in the respective parts of the connection backplate. In said manner the coils, which in any case do not require repair and therefore also need not be accessible, are reliably screened off from the water inside the device.

Operation of a UV lamp normally requires special voltages which are provided by separate control electronics. For said reason, a refinement of the invention is particularly preferred, in which the part of the connection backplate containing the location opening comprises control electronics, the input of which is connected to the coil in said part and the output of which is connected to the contacts of the location opening. Thus, the control electronics, which nowadays may be made very small, are integrated in the part of the connection backplate which is automatically de-energized when the housing is opened.

The control electronics, given the quality which is customary nowadays, are also so maintenance-free that they may be enclosed, in particular encapsulated, in the appropriate part of the location housing.

To intensify the effect of the UV lamp upon the micro-organisms situated in the water, there may be disposed in the housing a filtering apparatus, through which the water travelling between the inlet and the outlet of the housing has to pass and which is exposable to the light of the UV lamp. Said filtering apparatus, as the water flows through, retains the micro-organisms so that they are situated for a longer period in the, for them, lethal light of the UV lamp.

Finally, a refinement of the invention is preferred, in which a resilient pad is disposed between the end of the UV lamp remote from the connection backplate and the region of the housing adjacent thereto. Said resilient pad gently presses, on the one hand, the UV lamp with its cap region into the location opening of the connection backplate and, on the other hand, the part of the connection backplate having the location opening against the other part fastened to the housing.

Figure 2:
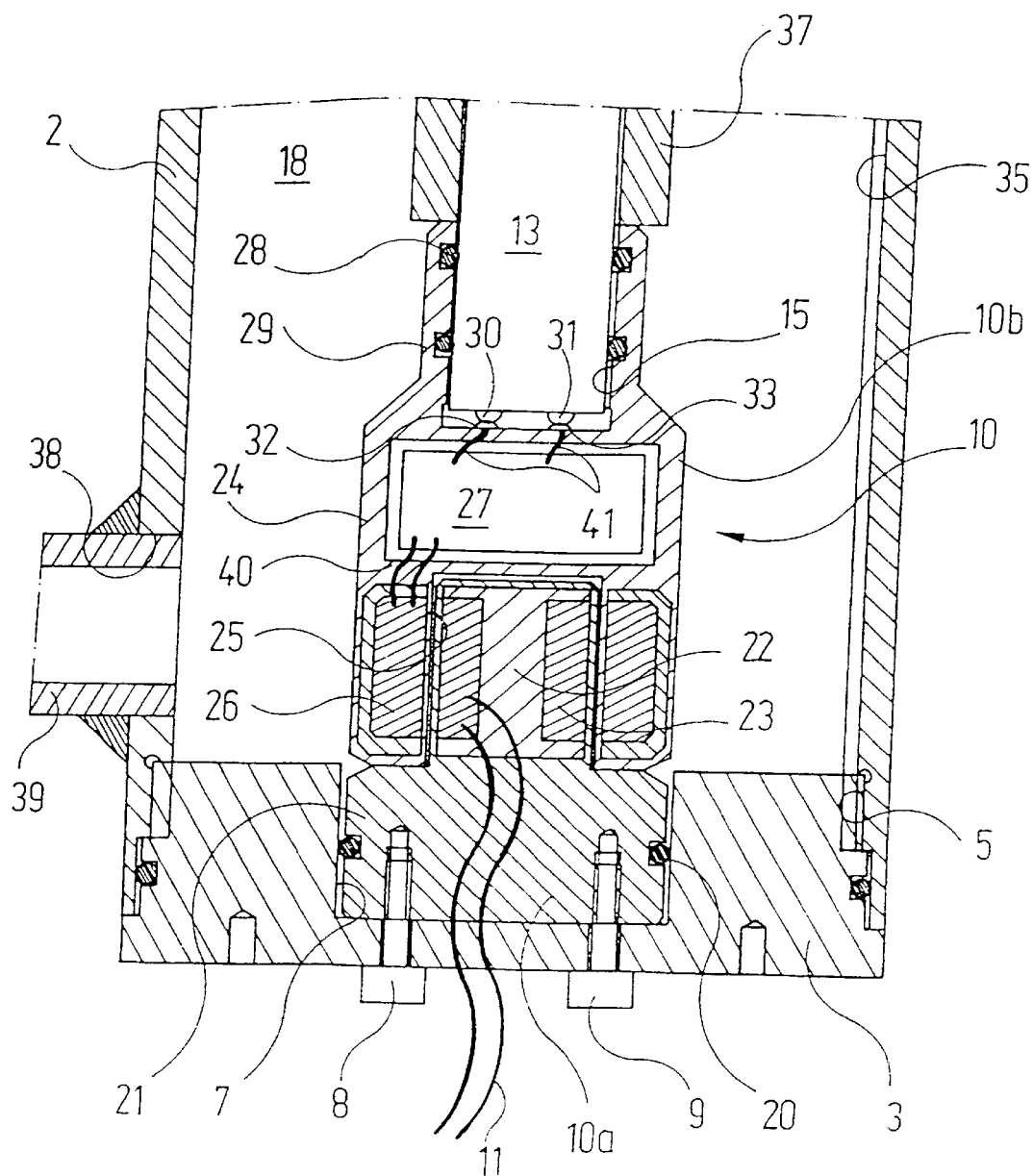
Figure 3:
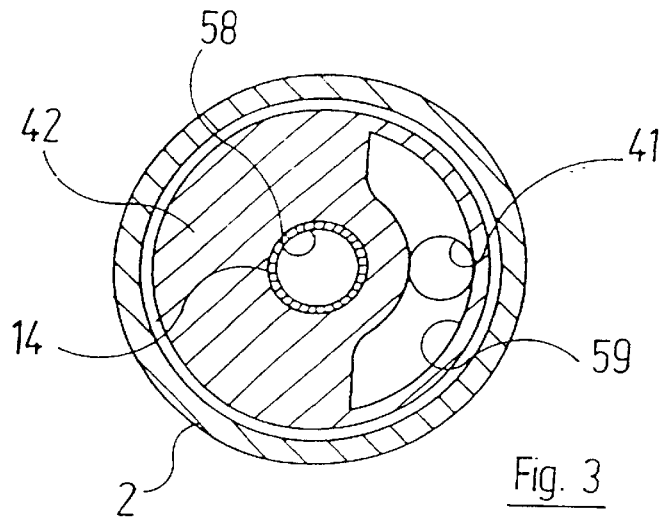
Figure 4:
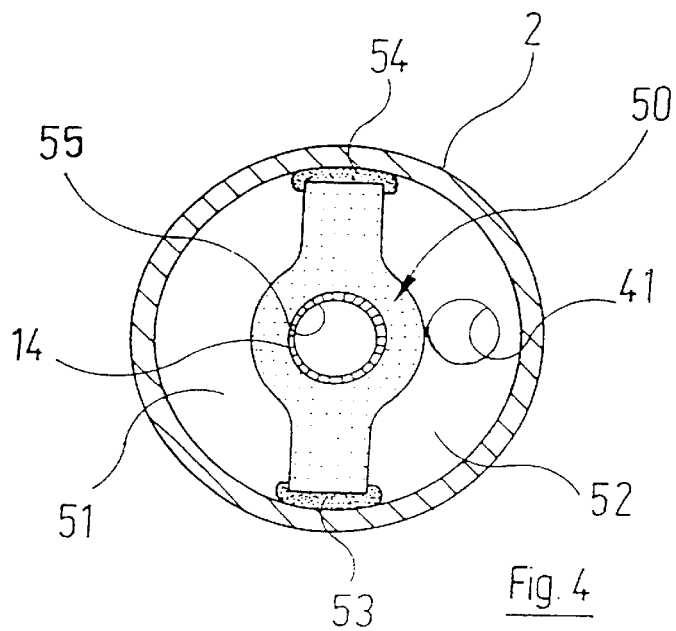
Figure 5:
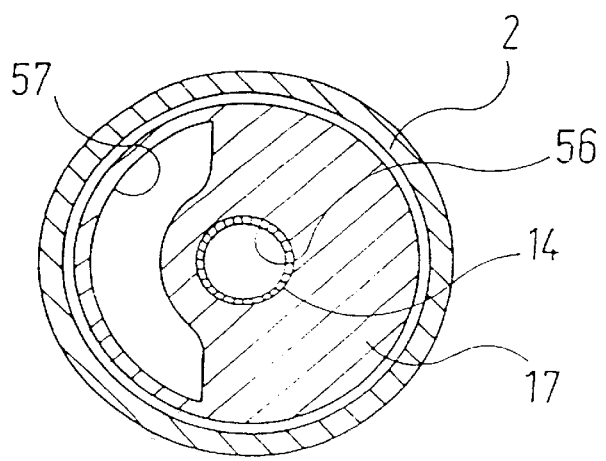

Embodiments of the invention are described in detail below with reference to the drawings; said drawings show:

FIG. 1: an axial section through a device for sterilizing and filtering water, which may be housed in a sanitary appliance;

FIG. 2: a partial enlargement from FIG. 1;

FIG. 3: a section along line III—III of FIG. 1;

FIG. 4: a section along line IV—IV of FIG. 1;

FIG. 5: a section along line V—V of FIG. 1.

The device for sterilizing and filtering water, which is illustrated in the drawings, is intended for installation in a water channel of a sanitary appliance. All of the dimensions are therefore such that they fit in such a flow channel. The device, which is denoted as a whole by the reference character 1, comprises a substantially cylindrical housing jacket 2, which is closed at the opposite ends by a base 3 and a lid 4. The connection between the housing jacket 2 and the base 3 or the lid 4 is effected in the illustrated embodiment with the aid of threads 5, 6 so that, after removal of said components, the interior of the housing jacket 2 is accessible.

A connection backplate 10, which is used to receive an elongate UV lamp 12, is fastened with the aid of screws 8, 9 in a recess 7 at the inside of the base 3.

The detailed refinement of the connection backplate 10 is shown in FIG. 2. It is composed of two parts 10a, 10b inserted one into the other. The stationary part 10a, which is fastened in the recess 7 of the base 3 by means of the screws 8, 9, is sealed against the wall of the recess 7 by means of an O-ring 20. Formed coaxially on the basic body 21, which is housed substantially inside the recess 7, of the connection backplate part 10a is a cylindrical neck 22, in which a first coil 23 used as the primary winding of a transformer is coaxially enclosed. Said first coil is connected by lines 11 to an external power source (not shown).

The second connection backplate part 10b mounted onto the first connection backplate part 10a comprises a substantially cylindrical main body 24, in which a cylindrical recess 25 is formed from below. The dimensions of the recess 25 are slightly greater than the dimensions of the neck 22 of the stationary connection backplate part 10a, such that the two connection backplate parts 10a, 10b may be snugly fitted together in the manner shown in FIG. 2.

In the region surrounding the recess 25, a second coil 26 serving as the secondary winding of the already mentioned transformer is enclosed inside the cylindrical main body 24 of the removable connection backplate part 10b so as to be coaxial with, and surround, the first coil 23. Above the recess 25 and above the second coil 26 control electronics 27, which are connected by lines 40 to the second coil 26, are housed inside the cylindrical main body 24. The control electronics 27, which are likewise enclosed in the cylindrical main part 24 of the removable connection backplate part 10b, produce from the output voltage of the second coil 26 the voltages required to operate the UV lamp 12.

Above the main body 24 the removable connection backplate part 10b comprises a cylindrical, upwardly open location opening 15 for the cap region 13 of the UV lamp 12. The cap region 13 of the UV lamp 12 and the location opening 15 are connected to one another in the manner of a bayonet lock (not shown) and sealed against one another by means of O-rings 28, 29. In the assembled position of the UV lamp 12, its contacts 30, 31 lie against contacts 32, 33 at the bottom of the location opening 15, which are connected by lines 41 to the control electronics 27.

A first intermediate plate 17, which is inserted from below into the housing 2, 3, 4, is fixed in the interior of the housing 2, 3, 4, wherein for determining the rotational position a radially projecting rib 34 is introduced into a groove 35 in the inner wall of the housing jacket 2. The first intermediate plate 17 in an upward direction lies against a small step 36 of the inner wall of the housing jacket 2 (cf. FIG. 1). In a downward direction the first intermediate plate 17 is supported via a distance piece 37 on the connection backplate 10.

The first intermediate plate 17 subdivides the interior of the housing 2, 3, 4 into an afflux chamber 18 and a treatment chamber 19. The afflux chamber 18 substantially surrounds the connection backplate 10 connected to the base 3, while the treatment chamber 19 surrounds the luminous element 14 of the UV lamp 12. Welded in a lateral opening 38, which penetrates the cylindrical housing jacket 2, is an angled connection piece 39 used to feed water into the afflux chamber 18 of the housing 2, 3, 4. In the lid 4 a paraxial bore 40 is provided, into which is screwed a discharge connection piece 41, through which the purified water passes back out of the device 1.

In the top region of the housing 2, 3, 4, below the lid 4, a second intermediate plate 42 is fastened in a similar manner to that described above for the first intermediate plate 17. However, said second intermediate plate 42 is introduced from above into the housing 2, 3, 4. It is pressed by the lid 4 against a step 43 of the inner wall of the housing jacket 2.

In the region lying between the two intermediate plates 17 and 42 the luminous element 14 of the UV lamp 12 is surrounded by a filtering apparatus, which as a whole bears the reference character 50. In the illustrated embodiment, the filtering apparatus comprises a sintered body 50 made of suitable material, which has the configuration shown in FIG. 4: it substantially takes the form of a wall which subdivides the interior of the housing 2, 3, 4 into two opposite halves 51, 52. For sealing said two sub-chambers 51, 52, the longitudinal edges of the sintered body 50 rest via profiled seals 53, 54 against the inner wall of the housing jacket 2. The entire sintered body 50 is penetrated by an axial through-bore 55, in which the luminous element 14 of the UV lamp 12 is accommodated.

As FIG. 5 reveals, the first intermediate plate 17 has a central through-opening 56, which receives the bottom region of the luminous element 14 of the UV lamp 12, as well as an opening 57 in the shape of a segment of a circle, which in the assembled state communicates with the sub-chamber 51 inside the housing 2, 3, 4.

In a similar manner the second intermediate plate 42 is provided with a central through-opening 58, into which the top end of the luminous element 14 of the UV lamp 12 is inserted; an opening 59 in the shape of a segment of a circle communicates, on the one hand, with the second sub-chamber 52 inside the housing 2, 3, 4 and, on the other hand, with the discharge connection piece 41.

Finally, inserted into a central recess 60 of the lid 40 is a resilient pad 61, into which the top end of the luminous element 14 of the UV lamp 12 is pressed so that the UV lamp 12 is gently fixed inside the device 1.

The device 1 described above operates as follows:

When the sanitary appliance, e.g. a draw-off appliance having the device 1 installed in its flow channel, is opened, water flows through the connection piece 21 into the afflux chamber 18 inside the housing 2. The UV lamp 12 is switched on. The water having passed into the afflux chamber 18 flows on from there through the opening 57 in the shape of a segment of a circle in the first intermediate plate 17 into the first sub-chamber 51 of the treatment chamber 19 and passes through the sintered body 50, wherein the particles which are contained in the water and are to be filtered out, but in particular micro-organisms such as amoebae and similar monocellular organisms, are retained by the sintered body 50. The thus purified water passes into the second sub-chamber 52 of the treatment chamber 19 and flows off from there through the opening 59 in the shape of a segment of a circle in the second intermediate plate 42 and through the discharge connection piece 41 and from there to the outlet (not shown) of the sanitary appliance.

The water, as it passes through the treatment chamber 19, is exposed to the disinfecting rays of the UV lamp 12. The micro-organisms trapped in the filter body 50 are killed under the influence of the UV radiation.

When after a specific operating period the UV lamp 12 needs to be exchanged or the device 1 requires attention for some other reason, this may be effected as follows:

The base 3 is unscrewed from the housing jacket 2 of the device 1, with the result that the first connection backplate part 10*b* connected to the base 3 detaches from the second connection backplate part 10*a*. In the process, all of the interior fittings of the device 1, i.e. in particular the second coil 26, the control electronics 27 and the contacts 32, 33, are immediately de-energized. The stationary connection backplate part 10, which is then exposed, does not pose any danger either, because the first coil 23 is encapsulated therein.

After removal of the base 3 with the stationary connection backplate part 10*a*, the second connection backplate part 10*b* with the UV lamp 12 may be withdrawn in a downward direction. It is then possible to exchange the UV lamp 12 safely under dry conditions. Reassembly of the device 1 is effected in the reverse order.

When access is to be gained to the sintered body 50, e.g. when the latter after a specific operating period has become clogged with trapped impurities, this may also be effected "from above" by unscrewing the lid 4. The second intermediate plate 42 may then be removed in an upward direction, thereby exposing the sintered body 50. The latter may then be withdrawn—in the view of FIG. 1—upwards over the luminous element 14 of the UV lamp 12. Reassembly is effected in the reverse order.

What is claimed is:

1. Device for sterilizing water flowing through a sanitary appliance, having
   a) a housing, which comprises an inlet and an outlet for the water;
   b) a UV lamp, which is disposed inside the housing and the radiation of which is directed towards the water flowing through;
   c) a connection backplate, which is connectable to an external power source and has a location opening, into which a cap region of the UV lamp is insertable, wherein location opening and cap region have contacts which lie against one another in the operating position of the UV lamp, characterized in that d) the connection backplate (10) is subdivided into two detachable, intermateable parts (10*a*, 10*b*), of which the one is fastened to the housing (2, 3, 4) and the other has the location opening (15);
   e) the two parts (10*a*, 10*b*) of the connection backplate (10) each contain a coil (23, 26), which coils are adjacent to one another in the intermated state of the backplate (10), wherein the coil (23) in the part (10*a*) fastened to the housing (2, 3, 4) is connectable to the external power source and the coil (26) in the other part (10*b*) is connected directly or indirectly to the contacts (32, 33) of the location opening (15) of said part (10*b*), wherein f) the location opening (15) of the connection backplate (10) is sealed against the cap region (13) of the UV lamp.

2. Device according to claim 1, characterized in that one of the two parts (10*a*) of the connection backplate (10) comprises a cylindrical neck (22) which, in the intermated state of the connection backplate (10), projects into a complementary recess (25) of the other part (10*b*).

3. Device according to claim 1 or 2, characterized in that the two coils (23, 26) in the two parts (10*a*, 10*b*) of the connection backplate (10), in the intermated state of the latter, are disposed coaxially with one another, one inside the other.

4. Device according to one of the preceding claims, characterized in that the two coils (23, 26) are enclosed, in particular encapsulated, in the respective part (10*a*, 10*b*) of the connection backplate (10).

5. Device according to one of the preceding claims, characterized in that the part (10*b*) of the connection backplate (10) containing the location opening (15) comprises control electronics (27), the input of which is connected to the coil (26) in said part (10*b*) and the output of which is connected to the contacts (32, 33) of the location opening (15).

6. Device according to claim 5, characterized in that the control electronics (27) are enclosed, in particular encapsulated, in the appropriate part (10*b*) of the connection backplate (10).

7. Device according to one of the preceding claims, characterized in that disposed in the housing (2, 3, 4) is a filtering apparatus (50), through which the water travelling between the inlet (39) and the outlet (41) of the housing (2, 3, 4) has to pass and which is exposable to the light of the UV lamp (12).

8. Device according to one of the preceding claims, characterized in that a resilient pad (61) is disposed between the end of the UV lamp (12) remote from the connection backplate (10) and the region (4) of the housing (2, 3, 4) adjacent thereto.

* * * * *